United States Patent
Lee et al.

(10) Patent No.: US 10,042,205 B2
(45) Date of Patent: Aug. 7, 2018

(54) BACKLIGHT MODULE

(71) Applicant: Young Lighting Technology Inc., Hsin-Chu (TW)

(72) Inventors: Chun-Wei Lee, Hsin-Chu (TW); Yu-Sung Lai, Hsin-Chu (TW); Sheng Chou, Hsin-Chu (TW); Han-Yuan Liu, Hsin-Chu (TW)

(73) Assignee: Young Lighting Technology, Inc., Hsin-Chu (TW)

( * ) Notice: Subject to any disclaimer, the term of this patent is extended or adjusted under 35 U.S.C. 154(b) by 0 days.

(21) Appl. No.: 15/621,203

(22) Filed: Jun. 13, 2017

(65) Prior Publication Data

US 2018/0067362 A1  Mar. 8, 2018

(30) Foreign Application Priority Data

Sep. 5, 2016 (TW) .............................. 105213576 U

(51) Int. Cl.
  *F21V 7/04* (2006.01)
  *G02F 1/1335* (2006.01)
  *G09G 3/34* (2006.01)

(52) U.S. Cl.
  CPC .. *G02F 1/133605* (2013.01); *G02F 1/133603* (2013.01); *G02F 1/133606* (2013.01); *G09G 3/342* (2013.01); *G09G 2320/0626* (2013.01)

(58) Field of Classification Search
  CPC ......... G02F 1/133603; G02F 1/133605; G02F 1/133606; G09G 2320/0626; G09G 3/342
  See application file for complete search history.

(56) References Cited

U.S. PATENT DOCUMENTS

2015/0234231 A1* 8/2015 Kawada ............ G02F 1/133605
  349/67
2015/0260899 A1* 9/2015 Cheol .................. G02B 6/0036
  362/606

FOREIGN PATENT DOCUMENTS

CN  104090424  10/2014
CN  205080339  3/2016

* cited by examiner

*Primary Examiner* — Ali Alavi
(74) *Attorney, Agent, or Firm* — Muncy, Geissler, Olds & Lowe, P.C.

(57) ABSTRACT

A backlight module includes a light guide plate, a plurality of light transmission elements and a light source. The light guide plate has at least one light incident surface, and the light transmission elements are disposed near the light incident surface and aligned to from at least one light transmission element row. The light source is disposed near one end of the light transmission element row and capable of emitting a light beam to the light transmission element row. Each of the light transmission elements reflects a part of the light beam to the light guide plate to form multiple independent light reflection paths, and the light transmission elements successively transmits a part of the light beam to form a light transmission path in the light transmission element row.

10 Claims, 6 Drawing Sheets

1

BACKLIGHT MODULE

BACKGROUND OF THE INVENTION

Field of the Invention

The invention relates to a backlight module.

Description of the Related Art

FIG. 1 shows a schematic diagram of a conventional backlight module. As shown in FIG. 1, a backlight module 100 includes a light guide plate 102 and a light bar 104 disposed near one side of the light guide plate 102. The light bar 104 may include a circuit board 104a and multiple white LEDs 104b disposed on the circuit board 104a. However, such design does not provide a dimming mechanism and thus fails to further improve display contrast. Besides, the white LEDs serving as a light source have low beam directionality that is unfavorable for enhancing light scattering efficiency of the light guide plate 102, and a comparatively large number of white LEDs is often needed to offer sufficient brightness and hence increase fabrication costs.

The information disclosed in this "BACKGROUND OF THE INVENTION" section is only for enhancement understanding of the background of the described technology, and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

BRIEF SUMMARY OF THE INVENTION

The invention provides a backlight module having a dynamic dimming mechanism.

Other objects and advantages of the invention may be further illustrated by the technical features broadly embodied and described as follows.

In order to achieve one or a portion of or all of the objects or other objects, one embodiment of the invention provides a backlight module including a light guide plate, a plurality of light transmission elements and a light source. The light guide plate has at least one light incident surface, and the light transmission elements are disposed near the light incident surface and aligned to from at least one light transmission element row. The light source is disposed near one end of the light transmission element row and capable of emitting a light beam to the light transmission element row. Each of the light transmission elements reflects a part of the light beam to the light guide plate to than multiple independent light reflection paths, and the plurality of light transmission elements successively transmits a part of the light beam to form a light transmission path in the light transmission element row. At least one of the plurality of light transmission elements is allowed to optionally leave the light transmission path and not to form a light reflection path corresponding to the at least one light transmission element.

Another embodiment of the invention provides a backlight module including a light guide plate, a plurality of first light transmission elements, a plurality of second light transmission elements, a first light source and a second light source. The light guide plate has a first side surface, a second side surface opposite the first side surface, a third side surface, a fourth side surface opposite the third side surface, and the third side surface and the fourth side surface are located between the first side surface and the second side surface. The first light transmission elements are disposed near the first side surface and aligned to form at least one first light transmission element row, and the second light transmission elements are disposed near the third side surface and aligned to form at least one second light transmission element row. The first light source is disposed near one end of the first transmission element row and capable of emitting a light beam to the first transmission element row, each of the first light transmission elements reflects a part of the light beam to the light guide plate to form multiple independent first reflection light paths, and the first light transmission elements successively transmits a part of the light beam starting from a first light transmission element nearest the first light source. The second light source is disposed near one end of the second transmission element row and capable of emitting a light beam to the second transmission element row. Each of the second light transmission elements reflects a part of the light beam to the light guide plate to form multiple independent second reflection light paths, and the second light transmission elements successively transmitting a part of the light beam starting from a second light transmission element nearest the second light source. The first reflection light paths cross the second reflection light paths, and at least one of the first and the second light transmission elements is allowed to be switched between a first mode of reflecting and a second mode of not reflecting the part of the light beam.

According to the above embodiments, only a single piece of a light source is needed to spread light over the entire light guide plate to reduce fabrication costs. Besides, a laser light source may be used to cooperate with the light transmission elements to lower power consumption, and the feature of high beam directionality of a laser light source may enhance light scattering efficiency and display color saturation. Further, at least one light transmission element is allowed to optionally leave the light transmission path and not to form a light reflection path corresponding to that light transmission element, thus achieving dynamic dimming in real time. In addition, the light transmission elements may be disposed near two different sides of the light guide plate to provide a two-dimensional dynamic dimming mechanism and thus achieve more finely dynamic dimming effects.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
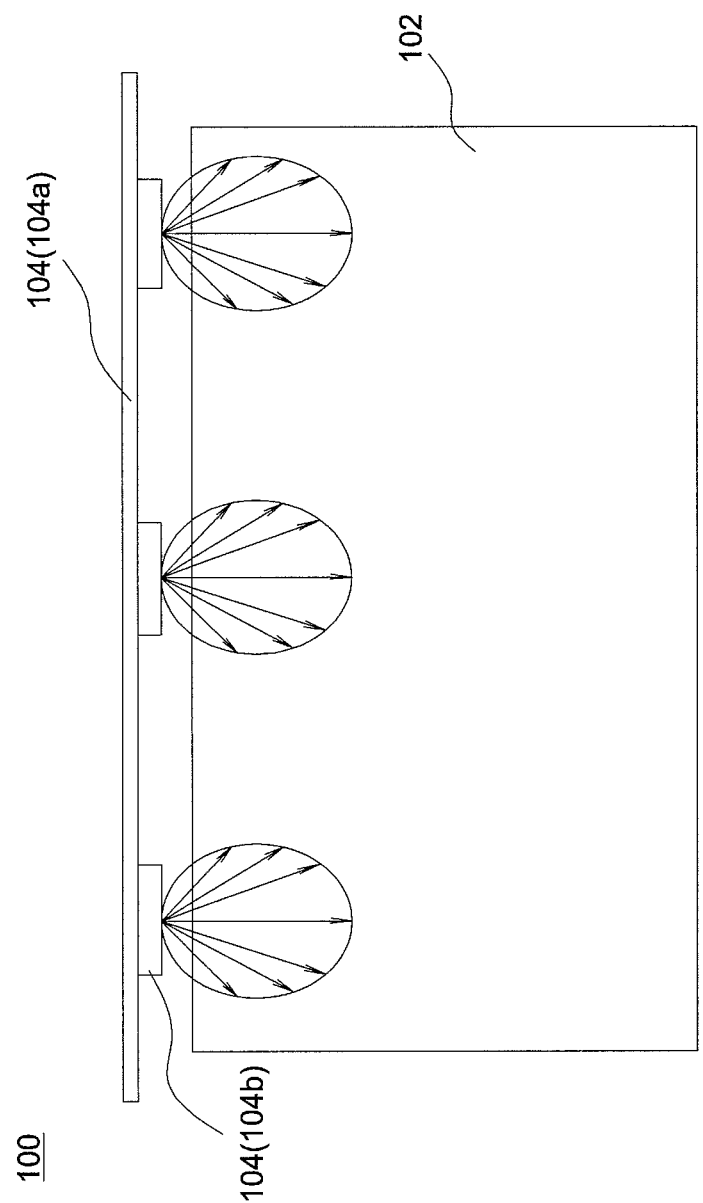
FIG. 1 shows a schematic diagram of a conventional backlight module.
Figure 2:
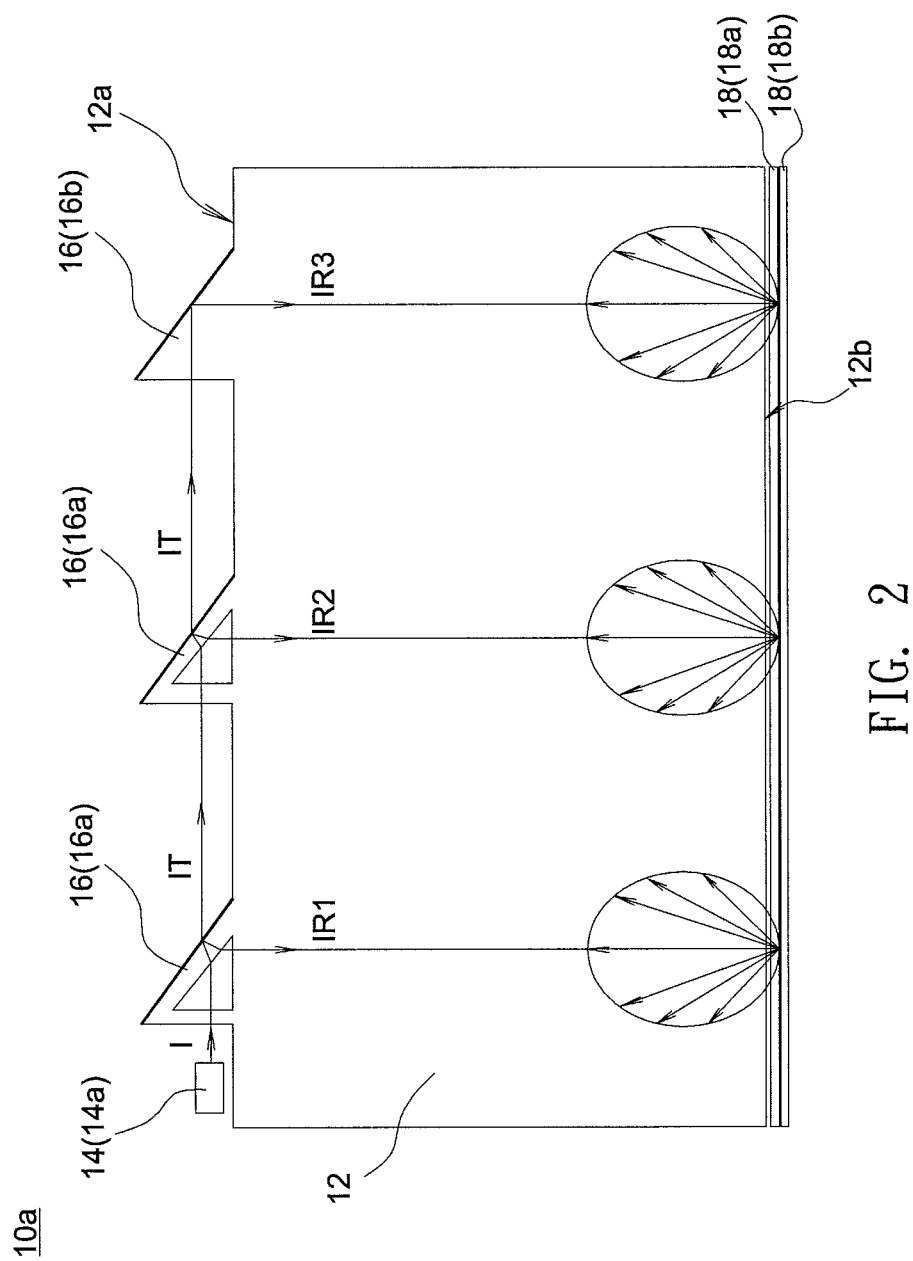
FIG. 2 shows a schematic diagram of a backlight module according to an embodiment of the invention.

FIG. 2 shows a schematic diagram of a backlight module according to an embodiment of the invention. Referring to FIG. 2, a backlight module 10a includes a light guide plate 12, a light source 14, a plurality of light transmission elements 16, and a light conversion media 18. The light guide plate 12 has a light incident surface 12a, and the light transmission elements 16 are disposed near the light incident surface 12a and aligned to form a light transmission element row. The light source 14 is disposed near the light incident surface 12a and one end (left end shown in FIG. 2) of the light transmission element row, and the light source 14 is capable of emitting a light beam I. In this embodiment, the light transmission elements 16 may include a plurality of transflective elements 16a and a reflective element 16b, the transflective elements 16a and the reflective element 16b are aligned in a direction parallel to a light emitting direction of the light source 14, and the reflective element 16b is disposed furthest away from the light source 14 among the light transmission elements 16. Besides, the transflective elements 16a and the reflective element 16b may be turning mirrors. In one embodiment, the light source 14 may be, but not limited to, a laser light source 14a. The light conversion media 18 may be disposed near an opposite surface 12b opposite the light incident surface 12a and may include a quantum dot layer 18a and a reflective sheet 18b to convert the light beam I from the laser light source 14a into white light. As shown in FIG. 2, each of the transflective elements 16a may reflect a first part of the light beam I and transmit a second part of the light beam I from the light source 14a. The first part of the light beam I forms reflection beams IR1 and IR2 that are to be directed to the light guide plate 12, and the second part of the light beam I forms a transmission beam IT that successively passes through each of the transflective elements 16a and is finally reflected by the reflective element 16b. The transmission beam IT reflected by the reflective element 16b is transformed into a reflection beam IR3 that is directed to the light guide plate 12. Then, the reflection beams IR1, IR2 and IR3 traveled in the light guide plate 12 are transformed into white light by the quantum dot layer 18a disposed between the opposite surface 12b and the reflective sheet 18b, and the white light is reflected by the reflective sheet 18b to back to the light guide plate 12. Finally, when the white light propagating in the light guide plate 104 strikes dot structures (not shown) on the light guide plate 12, the total reflection condition is no longer met, and the white light is allowed to pass through the top surface 104b and leave the light guide plate 104 in a normal direction. According to the above embodiment, the light transmission elements 16 may, from the first to the last one, successively transmit the transmission beam IT, and meanwhile each of the light transmission elements 16 reflects a part of the light beam I to the light guide plate 12 to form multiple independent reflection light paths (routed through reflection beams IR1, IR2 and IR3). Therefore, only a single piece of a light source is needed to spread light over the entire light guide plate 12 to reduce fabrication costs. Besides, in case a laser light source 14a such as a blue laser is used, the features of high beam directionality and low power dissipation of a laser light source may enhance light scattering efficiency. Further, the laser light source may provide better color saturation when laser light is transformed into white light by the quantum dot layer 18a to effect a display.

Figure 3:
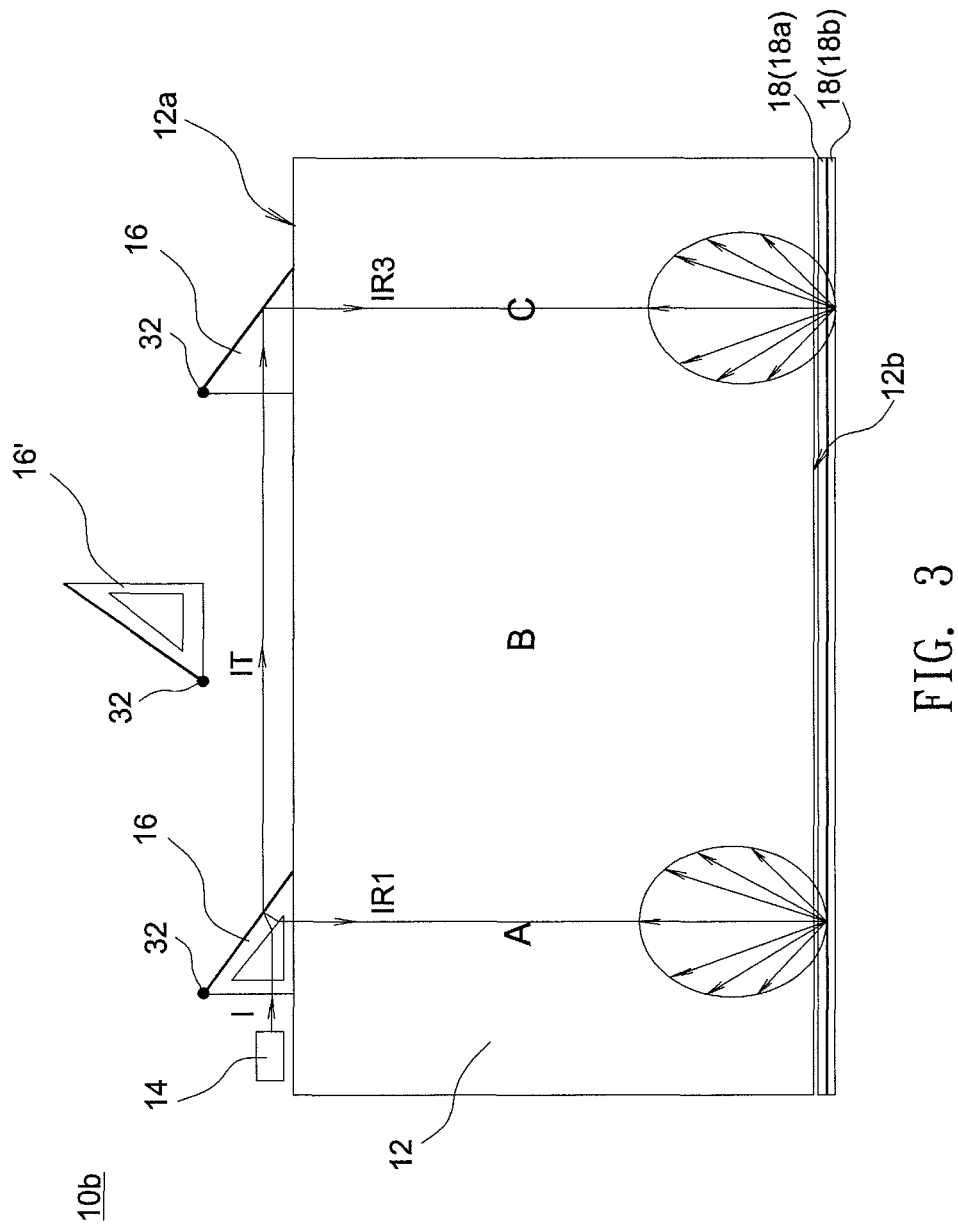
FIG. 3 shows a schematic diagram of a backlight module according to another embodiment of the invention.
Figure 4:
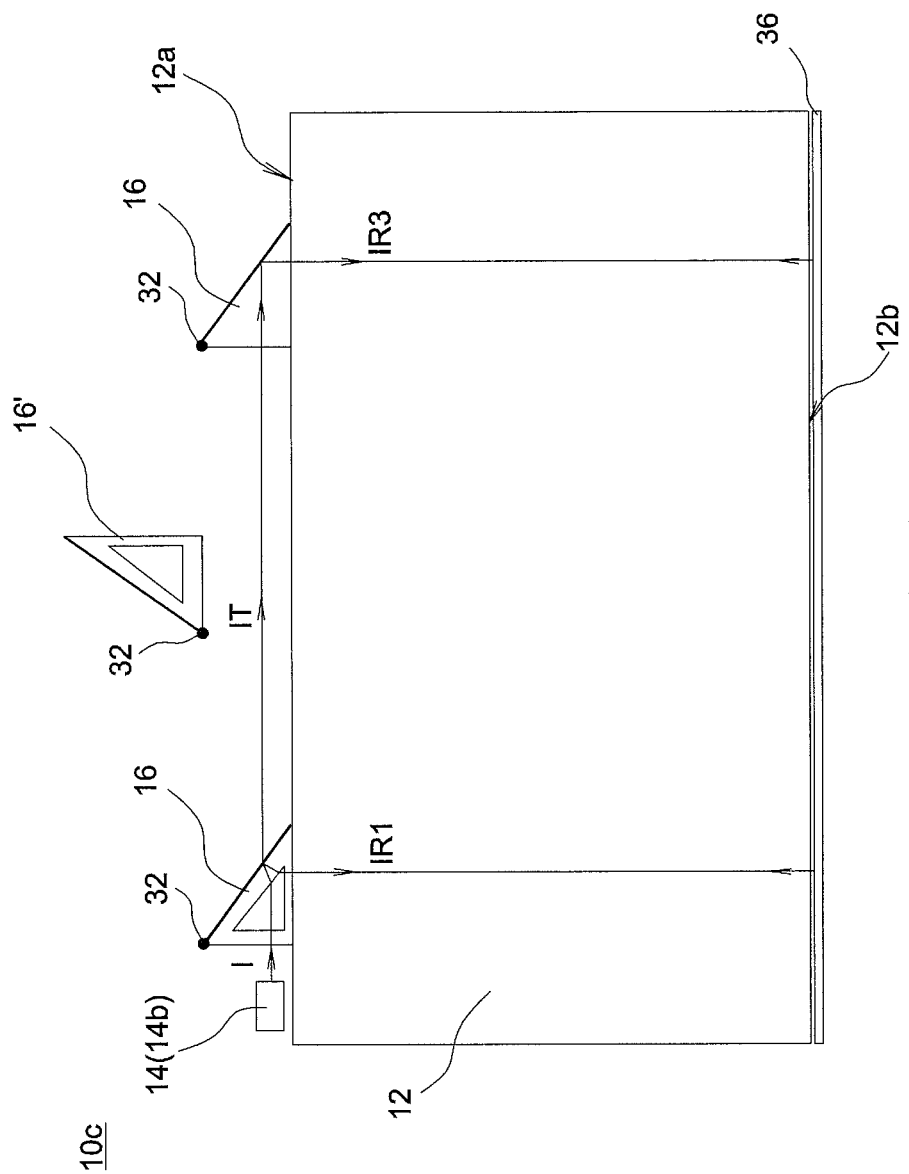
FIG. 4 shows a schematic diagram of a backlight module according to another embodiment of the invention.

Note the arrangement of the light transmission elements 16 relative to the light guide plate 12 is not limited. For example, the light transmission elements 16 may be integrally formed on the light guide plate 12 (shown in FIG. 2) or separate from the light guide plate 12 (shown in FIG. 3). FIG. 3 shows a schematic diagram of a backlight module according to another embodiment of the invention. Referring to FIG. 3, each of the light transmission elements 16 is separate from the light guide plate 12 and moved by a driver. The driver may be, but not limited to, a rotatable positioning element such as a rotatable positioning pillar 32. In this embodiment, each of the three light transmission elements 16 and 16' of the backlight module 10b is pivoted on a rotatable positioning pillar 32, and the light guide plate 12 may be divided into three sections A, B and C corresponding to the positions of the three light transmission elements 16 and 16'. For example, when an LCD using backlight from the backlight module 10b to display an image, brightness level signals of all sub pixels of the LCD are fed into a microcontroller (MCU) to make calculations and judgments. When the middle section B of the light guide plate 12 is judged to decrease brightness, the microcontroller may send a signal to the rotatable positioning pillar 32 corresponding to the section B to allow the rotatable positioning pillar 32 to rotate the light transmission elements 16'. In that case, the light transmission elements 16' driven by the positioning pillar 32 is moved out of the light path of the transmission beam IT and no longer reflects a light beam, and thus a reflection light path corresponding to the light transmission element 16' does not exist (reflection beam IR2 shown in FIG. 2 is not formed). Therefore, the brightness of the section B of the light guide plate 12 is reduced to achieve the effect of local dimming. According to the above embodiment, the driver is driven in real time upon receiving the brightness level signal of each sub pixel to allow at least one light transmission element to optionally leave the light transmission path and not to reflect a light beam. Therefore, a reflection path corresponding to a movable light transmission element can be optionally formed to achieve real-time dynamic dimming and thus enhance brightness uniformity and display contrast. Besides, in this embodiment, a laser light source 14a may be used and cooperates with a light conversion media 18 to coverts laser light from the laser light source 14a into white light. The laser light source 14a with high beam directionality cooperating with the above dynamic diming mechanism may further enhance display contrast. Certainly, the light source used in the above embodiments is not limited to a specific type. As shown in FIG. 4, a backlight module 10c may use a white light source 14b to omit the light conversion media 18. In that case, a reflective sheet 36 is disposed near the opposite surface 12b to directly reflect light beams leaving the light guide plate 12 back to the light guide plate 12. Further, the white light source 14b may include, but not limited to, a white LED or a combination of R/G/B LEDs.

Figure 5:
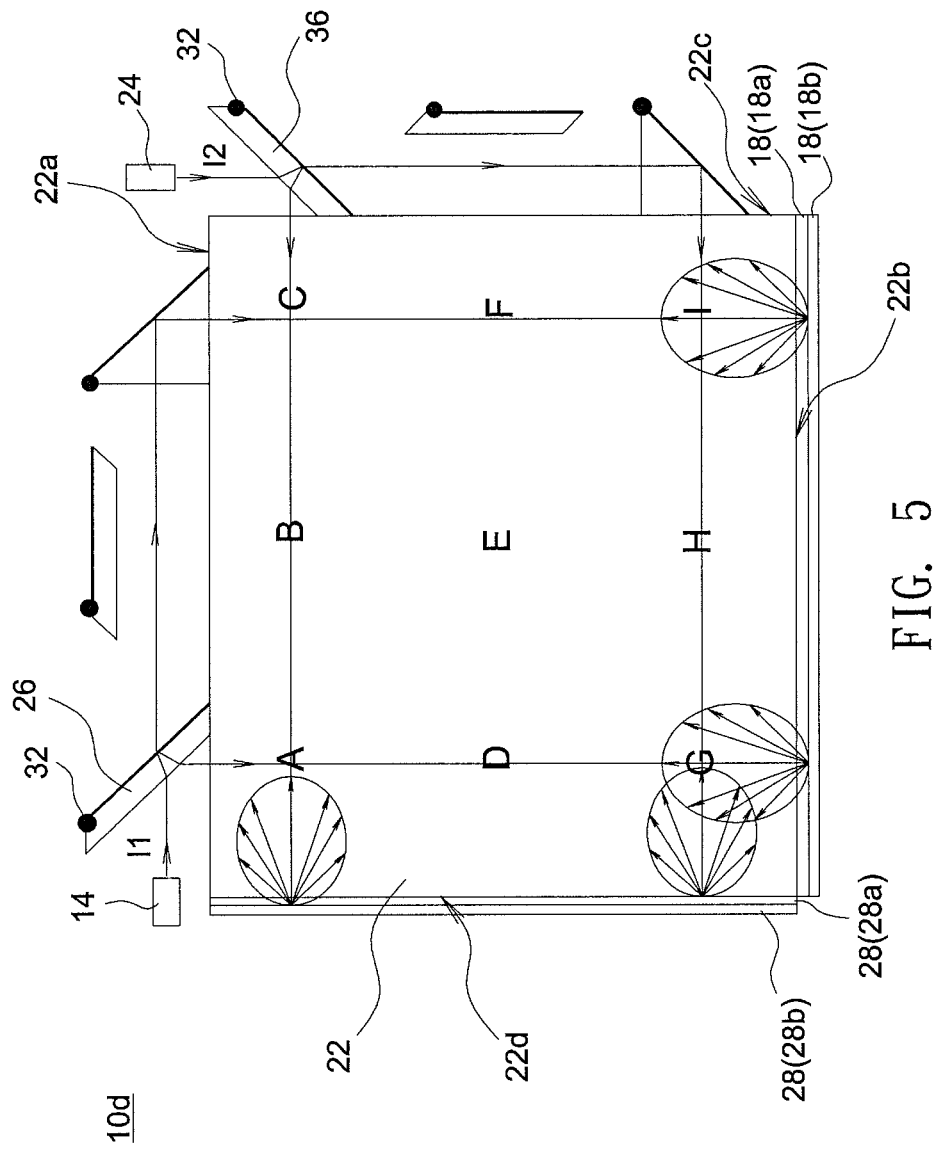
FIG. 5 shows a schematic diagram of a backlight module according to another embodiment of the invention.

The light transmission elements are not limited to be disposed near only one side of the light guide plate. As shown in FIG. 5, in an alternate embodiment, a light guide plate 22 of a backlight module 10d has a first side surface 22a, a second side surface 22b opposite the first side surface 22a, a third side surface 22c, and a fourth side surface 22d opposite the third side surface 22c. The third side surface 22c and the fourth side surface 22d are located between the first side surface 22a and the second side surface 22b. Multiple first light transmission elements 26 are disposed near the first side surface 22a and aligned to form at least one first light transmission element row, and multiple second light transmission elements 36 are disposed near the third side surface 22c and aligned to form at least one second light transmission element row. A first light source 14 is disposed near one end of the first light transmission element row and capable of emitting a light beam I1 to the first light transmission element row, and each of the first light transmission elements 26 reflects a part of the light beam I1 to the light guide plate 22 to form multiple independent first reflection light paths, and the first light transmission elements 26 successively transmit, starting from the light transmission element 26 nearest the first light source 14, a part of the light beam I1. A second light source 24 is disposed near one end of the second light transmission element row and capable of emitting a light beam I2 to the second light transmission element row, and each of the second light transmission elements 36 reflects a part of the light beam I2 to the light guide plate 22 to form multiple independent second reflection light paths, and the—second light transmission element 36 successively transmits, starting from the light transmission element 36 nearest the second light source 24, a part of the light beam I2. According to the above embodiment, the first reflection light paths (formed as a result of the first light transmission element 26 on a horizontal side of the light guide plate 22) may cross the second reflection light paths (formed as a result of the second light transmission element 36 on a vertical side of the light guide plate 22) to divide the light guide plate 22 into nine sections A-I corresponding to the light transmission elements 26 and 36. Since at least one of the light transmission elements 26 and 36 can be switched between a first mode of reflecting and a second mode of not reflecting the light beam, the brightness of the sections A-I can be adjusted in real time. By way of the above embodiment, the light transmission elements are disposed near two different sides of the light guide plate to provide a two-dimensional dynamic dimming mechanism and thus achieve more finely dynamic dimming effects. Further, the light source used in the above embodiment is not limited to a specific type. The light sources 14 and 24 may be, but not limited to, laser light sources. In that case, a first light conversion media 18 (such as a quantum dot layer 18a and a reflective sheet 18b) is disposed near the second side surface 22b, and a second light conversion media 28 (such as a quantum dot layer 28a and a reflective sheet 28b) is disposed near the fourth side surface 22d to convert laser light into white light.

Figure 6A:
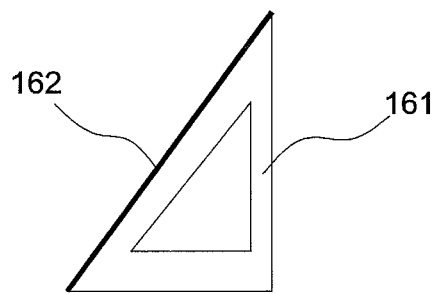
FIGS. 6A and 6B show schematic diagrams of different structures of a light transmission element according to various embodiments of the invention.
Figure 6B:
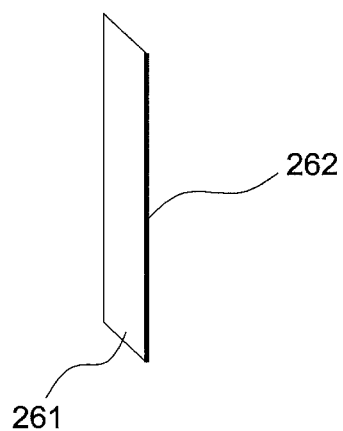

Further, the light transmission element according to the above embodiments is not limited to a specific structure, as long as the effect of reflecting and transmitting a light beam to travel along a determined light path is achieved. For example, as shown in FIG. 6A, the light transmission element 16 may include a transparent triangular prism 161 and a transflective mirror 162 attached to a surface of the transparent triangular prism 161. In another embodiment, as shown in FIG. 6B, the light transmission element 26 may include a transparent prism 261 having a pair of parallel prism surfaces, and a transflective mirror 262 may be attached to one of the parallel prism surfaces.

According to the above embodiments, only a single piece of a light source is needed to spread light over the entire light guide plate to reduce fabrication costs. Besides, a laser light source may be used to cooperate with the light transmission elements to lower power consumption, and the feature of high beam directionality of a laser light source may enhance light scattering efficiency and display color saturation. Further, at least one light transmission element is allowed to optionally leave the light transmission path and not to form a light reflection path corresponding to that light transmission element, thus achieving dynamic dimming in real time. In addition, the light transmission elements may be disposed near two different sides of the light guide plate to provide a two-dimensional dynamic dimming mechanism and thus achieve more finely dynamic dimming effects.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate having at least one light incident surface;
   a plurality of light transmission elements disposed near the light incident surface and aligned to from at least one light transmission element row; and
   a light source disposed near one end of the light transmission element row and capable of emitting a light beam to the light transmission element row, each of the light transmission elements reflecting a part of the light beam to the light guide plate to form multiple independent light reflection paths, and the plurality of light transmission elements successively transmitting a part of the light beam to form a light transmission path in the light transmission element row, wherein at least one of the plurality of light transmission elements is allowed to optionally leave the light transmission path and not to form a light reflection path corresponding to the at least one light transmission element.

2. The backlight module as claimed in claim 1, wherein the light source is a laser light source, and the backlight module further comprises:
   a light conversion media disposed on the light reflection paths to covert laser light from the laser light source into white light.

3. The backlight module as claimed in claim 2, wherein the light conversion media comprises:
   a reflective sheet disposed near an opposite surface opposite the light incident surface of the light guide plate; and
   a quantum dot layer disposed between the opposite surface and the reflective sheet, wherein the part of the light beam reflected by the light transmission elements is converted into white light and reflected by the reflective sheet to back to the light guide plate.

4. The backlight module as claimed in claim 1, wherein the light transmission elements comprises a plurality of turning mirrors aligned in a direction parallel to a light emitting direction of the light source, one of the plurality of turning mirrors disposed furthest away from the light source only reflects a part of the light beam, and a remainder of the plurality of turning mirrors both reflects a part of the light beam and transmits a part of the light beam.

5. The backlight module as claimed in claim 1, wherein at least one of the plurality of light transmission elements comprises a transparent prism and a transflective mirror attached to a surface of the transparent prism.

6. The backlight module as claimed in claim 5, wherein the transparent prism is a triangular prism or has a pair of parallel prism surfaces.

7. The backlight module as claimed in claim 1, further comprising:
   at least one driver for moving the at least one light transmission element to allow the at least one light transmission element to be switched between a first mode of reflecting and a second mode of not reflecting the part of the light beam.

8. The backlight module as claimed in claim 7, wherein the driver is a rotatable positioning element, and the at least one light transmission element is pivoted on the rotatable positioning element.

9. A backlight module, comprising:
   a light guide plate having a first side surface, a second side surface opposite the first side surface, a third side surface, a fourth side surface opposite the third side surface, and the third side surface and the fourth side surface being located between the first side surface and the second side surface;
   a plurality of first light transmission elements disposed near the first side surface and aligned to form at least one first light transmission element row;
   a plurality of second light transmission elements disposed near the third side surface and aligned to form at least one second light transmission element row;
   a first light source disposed near one end of the first transmission element row and capable of emitting a light beam to the first transmission element row, each of the first light transmission elements reflecting a part of the light beam to the light guide plate to form multiple independent first reflection light paths, and the plurality of first light transmission elements successively transmitting a part of the light beam starting from a first light transmission element nearest the first light source; and
   a second light source disposed near one end of the second transmission element row and capable of emitting a light beam to the second transmission element row, each of the second light transmission elements reflecting a part of the light beam to the light guide plate to form multiple independent second reflection light paths, the plurality of second light transmission elements successively transmitting a part of the light beam starting from a second light transmission element nearest the second light source, the first reflection light paths crossing the second reflection light paths, and at least one of the first and the second light transmission elements being allowed to be switched between a first mode of reflecting and a second mode of not reflecting the part of the light beam.

10. The backlight module as claimed in claim 9, wherein each of the first light source and the second light source is a laser light source, and the backlight module further comprises:
    a first light conversion media disposed near the second side surface to covert the part of the light beam reflected by the first light transmission elements to the light guide plate into white light; and
    a second light conversion media disposed near the fourth side surface to covert the part of the light beam reflected by the second light transmission elements to the light guide plate into white light.

\* \* \* \* \*